(12) United States Patent
Basler

(10) Patent No.: US 8,890,513 B2
(45) Date of Patent: Nov. 18, 2014

(54) DEVICE FOR MEASURING THE ANGLE OF ROTATION OF TWO OBJECTS ROTATING IN RELATION TO EACH OTHER

(75) Inventor: Stefan Basler, Brigachtal (DE)

(73) Assignee: Sick Stegmann GmbH, Donaueschingen (DE)

( * ) Notice: Subject to any disclaimer, the term of this patent is extended or adjusted under 35 U.S.C. 154(b) by 303 days.

(21) Appl. No.: 13/372,173

(22) Filed: Feb. 13, 2012

(65) Prior Publication Data

US 2012/0235672 A1   Sep. 20, 2012

(30) Foreign Application Priority Data

Mar. 18, 2011   (EP) ..................................... 11002248

(51) Int. Cl.
| | | |
|---|---|---|
| *G01B 7/14* | (2006.01) |
| *G01R 33/02* | (2006.01) |
| *G01B 7/30* | (2006.01) |
| *G01D 5/14* | (2006.01) |
| *G01D 5/34* | (2006.01) |

(52) U.S. Cl.
CPC ................ *G01D 5/345* (2013.01); *G01D 5/145* (2013.01)
USPC .................................. 324/207.14; 324/207.25

(58) Field of Classification Search
None
See application file for complete search history.

(56) References Cited

U.S. PATENT DOCUMENTS

| 2,029,170 | A | | 1/1936 | Hull | |
|---|---|---|---|---|---|
| 3,804,522 | A | | 4/1974 | Smith | |
| 4,577,414 | A | * | 3/1986 | Migliori et al. | ............. 33/363 K |
| 4,958,072 | A | * | 9/1990 | Hofler et al. | ............. 250/231.13 |
| 6,577,119 | B1 | * | 6/2003 | Yaddehige | ................. 324/207.2 |
| 2003/0039430 | A1 | * | 2/2003 | Deliwala | ........................ 385/14 |
| 2010/0060267 | A1 | * | 3/2010 | Wagner | ..................... 324/207.2 |
| 2010/0118305 | A1 | * | 5/2010 | Siraky et al. | .................. 356/368 |

FOREIGN PATENT DOCUMENTS

| DE | 35 22 243 A1 | 4/1986 |
|---|---|---|
| DE | 102 40 239 A1 | 3/2004 |

OTHER PUBLICATIONS

European Search Report cited in European Application No. 11002248.0, dated Aug. 3, 2011, five (5) pages.

* cited by examiner

*Primary Examiner* — Melissa Koval
*Assistant Examiner* — Courtney McDonnough
(74) *Attorney, Agent, or Firm* — Nath, Goldberg & Meyer; Jerald L. Meyer; Sanjana Mangalagiri

(57) ABSTRACT

Device for measuring the rotating angle of two objects rotating in relation to each other, with a transmitter which is assigned to one of the objects and which emits light that is either polarized or becomes polarized by means of a polarization filter, and with a polarization-sensitive analyzer such that the transmitter and the analyzer rotate relative to each other as dependent on the rotating angle, and with a receiver which measures the intensity of light passing through the analyzer in order to create a signal that is dependent on the rotating angle, where a magnetized element is positioned on one of the objects and a sensor for detecting a magnetic field is positioned on the other object.

7 Claims, 1 Drawing Sheet

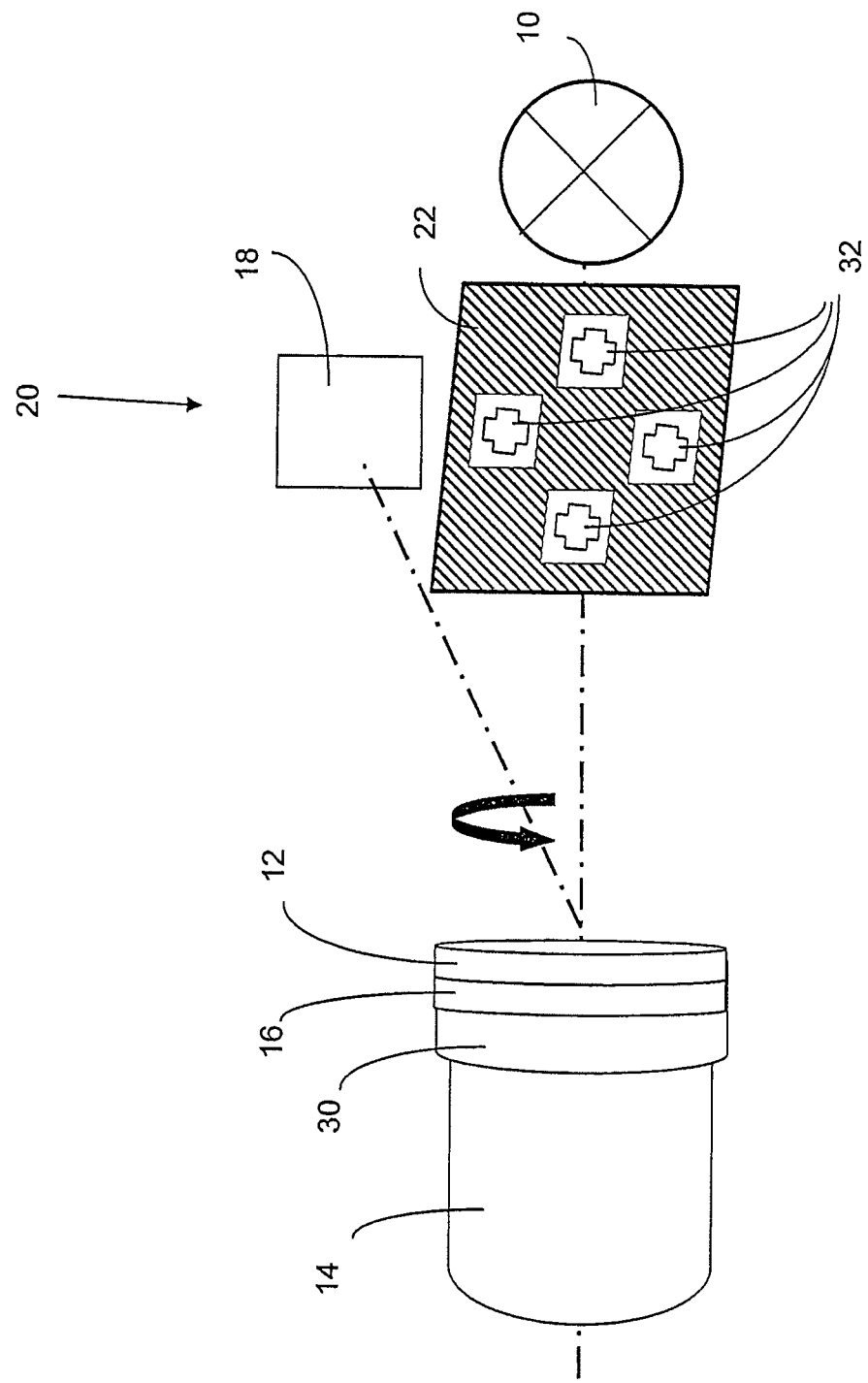

DEVICE FOR MEASURING THE ANGLE OF ROTATION OF TWO OBJECTS ROTATING IN RELATION TO EACH OTHER

The invention relates to a device for measuring the angle of rotation of two objects rotating in relation to each other, in accordance with the preamble of claim 1.

For many applications, it is of basic importance to measure the angle of rotation of the rotating object. In general, the rotating angle of the rotating object is measured in relation to a stationary object, to which a measuring unit is attached. For example, the rotating object may be one that rotates around the rotating wheel of a motor relative to a stationary machine part. The measuring unit may be both incremental and absolute. Here it is desirable to perform a measurement that is as insensitive to tolerance as possible, but one that also has a high degree of accuracy. In the ideal case, the measurement is performed without contact, in order to avoid mechanical wear.

EP 2 187 178 A1 discloses a principle of measurement that uses the optical polarization of light. To measure the rotating angle of two objects rotating opposite each other, a transmitter emits light that is polarized in linear fashion. The light passes through a polarization filter which rotates opposite the transmitter in dependence on the rotating angle. The intensity of the light passing through the polarization filter is measured by a receiver and is evaluated or plotted as a signal that is a function of the rotating angle.

When polarization is used in measuring the rotating angle of two objects rotating in relation to each other, it is disadvantageous that the rotating angle cannot be mechanically measured in absolute fashion over 360°, but only over 180°.

The goal of the invention, therefore, is to specify an improved device for measuring the rotating angle of two objects rotating in relation to each other, a device which, in particular, can determine the rotating angle over 360° in absolute fashion.

The goal of the invention is achieved with a device with the features of patent claim 1.

The device according to the invention for measuring the rotating angle of two objects rotating in relation to each other—with a transmitter which is assigned to one of the objects and which emits light that is either polarized or becomes polarized by means of a polarization filter, and with a polarization-sensitive analyzer such that the transmitter and the analyzer rotate relative to each other as dependent on the rotating angle, and with a receiver which measures the intensity of light passing through the analyzer in order to create a signal that is dependent on the rotating angle—is distinguished by the fact that a magnetized element is positioned on one of the objects and a sensor for detecting a magnetic field is positioned on the other object. The use of a magnetized element provides additional information, which in turn makes it possible to detect whether a rotation of 180° has occurred, and this, in combination with the information regarding the polarization of light, makes it possible to measure the rotating angle over 360°. An absolute rotational gauge is thereby provided in a simple manner.

The magnetized element is advantageously positioned on the rotating object, and this creates a cost-effective design. In particular, the sensor can have a stationary construction, which in turn permits a simple structural design.

According to a particularly advantageous embodiment of the invention, the sensor is designed as a Hall sensor. This kind of sensor is inexpensive and permits the magnetic field to be detected in a simple manner.

The magnetized element is advantageously designed to serve as a support surface for the analyzer, in order to permit a simple and compact design.

The analyzer is advantageously designed as a polarization film. Such polarization films are inexpensive to manufacture. In particular, films of this type can be stabilized in a simple manner when the analyzer is positioned on the magnetized element.

According to a particularly preferred embodiment of the invention, the receiver and the sensor for detecting a magnetic field are constructed on a semiconductor component and, in particular, are integrated on a CMOS-ASIC, thereby permitting a cost-effective and space-saving configuration.

The invention is next explained in detail on the basis of the following FIGURE, which shows:

FIG. 1: a schematic depiction of a device for measuring the rotating angle of two objects rotating relative to each other, in accordance with an exemplary embodiment of the invention.

FIG. 1 depicts a device for measuring the rotating angle of two objects rotating relative to each other. In the present case, only one object has a rotating design—namely a shaft 14, e.g., that of a motor. Here the rotating angle of the shaft 14 is to be ascertained relative to a stationary part, e.g., the motor housing or a stationary machine part. The device has a polarization sensor 20, which comprises at least one light source 10 and a light receptor 18, which is positioned in stationary fashion and can be assigned, e.g., to the stationary part.

The light source 10 belonging to the polarization sensor 20 emits polarized light and can be designed, e.g., as a laser. As an alternative, it is also possible to use an unpolarized light source, with a polarizer positioned downstream. In yet another alternative, the positions of the light source 10 and the light receptor 18 can be reversed, so that unpolarized light is emitted and a polarizer 22 is positioned in front of the receiver, with the result that the receiver 10 receives only polarized light.

Assigned to the rotating shaft 14 is a mirror 16 which rotates along with the shaft 14. A polarization filter 12, which also rotates with the shaft, is positioned in front of which mirror 16. The intensity of the light which is detected in the receiver of the polarization sensor 20 changes with the rotating angle of the rotating shaft 14 and is at a maximum when the polarization plane of the polarized light from the light source coincides with the polarization plane of the polarization filter 12, and is at a minimum when the polarization plane of the polarized light from the light source 10 is perpendicular to the polarization plane of the polarization filter 12. The rotating angle can thus be measured over a half rotation of the shaft without further auxiliary means.

Positioned on the shaft 14, furthermore, is a magnetized element 30 that rotates with the shaft 14. The magnetized element 30 is magnetized in radial fashion. The two magnetic poles of the magnetized element 30 are thus positioned opposite each other, so that a rotation of the shaft 14 over 180° is detected by a sensor 32 for detecting a magnetic field. The sensor 32 is designed so as not to impede the optical function of the polarization sensor 20. However, it can detect the magnetic field of the magnetized element 20, which is modulated at the site of the sensor 32 by the rotating motion of the shaft 14. Thus, in evaluating the magnetic field detected by the sensor 32, as well as the light intensity detected by the receiver of the polarization sensor 20, it is possible overall to measure the rotating angle of the shaft 14 for one entire rotation of the shaft 14.

The polarization filter 12 is advantageously designed as a polarization film and is positioned on the magnetized element 30.

The sensor 32 is advantageously designed as a Hall sensor. In particular, the sensor 32, together with the polarization sensor 20, is advantageously integrated into a semiconductor component, for example, a CMOS-ASIC, and thereby provides a space-saving configuration.

The invention claimed is:

1. Device for measuring the rotating angle of two objects rotating in relation to each other comprising
    a transmitter which is assigned to one of the objects and which emits light that is either polarized or becomes polarized by means of a polarization filter,
    a polarization-sensitive analyzer such that the transmitter and the analyzer rotate relative to each other as dependent on the rotating angle, and
    a receiver which measures the intensity of light passing through the analyzer in order to create a signal that is dependent on the rotating angle,
    wherein a magnetized element is positioned on one of the objects and a sensor for detecting a magnetic field is positioned on the other object such that on evaluation of the magnetic field detected by the sensor and the light intensity detected by the receiver, a measurement of the angle of rotation is made possible for an entire rotation.

2. Device according to claim 1, wherein the magnetized element is positioned on the rotating object.

3. Device according to claim 1, wherein the magnetized element is magnetized in radial fashion.

4. Device according to claim 1, wherein the sensor is designed as a Hall sensor.

5. Device according to claim 1, wherein the magnetized element is designed as a support surface for the analyzer.

6. Device according to claim 1, wherein the analyzer is designed as a polarization film.

7. Device according to claim 1, wherein the receiver and the sensor for detecting a magnetic field are constructed on a semiconductor element and, in particular, are integrated on a CMOS-ASIC.

* * * * *